United States Patent
Tang et al.

(10) Patent No.: US 9,281,734 B2
(45) Date of Patent: Mar. 8, 2016

(54) LINEAR MOTOR WITH BACK YOKE

(75) Inventors: Yuqi Tang, Nagano (JP); Satoshi Sugita, Nagano (JP); Shigenori Miyairi, Nagano (JP)

(73) Assignee: SANYO DENKI CO., LTD., Tokyo (JP)

( * ) Notice: Subject to any disclaimer, the term of this patent is extended or adjusted under 35 U.S.C. 154(b) by 927 days.

(21) Appl. No.: 13/531,639

(22) Filed: Jun. 25, 2012

(65) Prior Publication Data

US 2012/0326537 A1  Dec. 27, 2012

(30) Foreign Application Priority Data

Jun. 27, 2011 (JP) ................ 2011-142207

(51) Int. Cl.
*H02K 41/03* (2006.01)
*H02K 35/02* (2006.01)

(52) U.S. Cl.
CPC .............. *H02K 41/031* (2013.01); *H02K 35/02* (2013.01)

(58) Field of Classification Search
CPC ............................. H02K 41/031; H02K 35/02
USPC ................................... 310/34, 35, 36
See application file for complete search history.

(56) References Cited

U.S. PATENT DOCUMENTS

| | | | | |
|---|---|---|---|---|
| 3,471,729 A | * | 10/1969 | Latta et al. | ............... H02K 5/04 310/112 |
| 4,358,691 A | * | 11/1982 | Naylor | .................. H01F 7/1615 310/12.04 |
| 6,969,929 B2 | * | 11/2005 | Finkbeiner | ............... H02K 3/47 310/12.21 |
| 2006/0028072 A1 | * | 2/2006 | Iwasa | ..................... H02K 41/03 310/14 |
| 2008/0079522 A1 | | 4/2008 | Okada et al. | |
| 2009/0033157 A1 | * | 2/2009 | Maemura | ............... H02K 41/03 310/12.22 |

FOREIGN PATENT DOCUMENTS

| | | |
|---|---|---|
| JP | S51-007605 U | 1/1976 |
| JP | 07-322595 | 12/1995 |
| JP | 09-172767 | 6/1997 |
| JP | 2005-124334 | 5/2005 |
| JP | 2007-306704 | 11/2007 |
| JP | 2008-086144 | 4/2008 |
| JP | 2009-100617 | 5/2009 |
| JP | 2009-247068 | 10/2009 |
| JP | 4385406 | 12/2009 |
| JP | 2010-288418 | 12/2010 |
| JP | 2011-120405 | 6/2011 |
| WO | 2007/046161 | 4/2007 |
| WO | 2011/001668 | 1/2011 |

OTHER PUBLICATIONS

Japanese Office Action dated Dec. 24, 2014, 6 pages.

* cited by examiner

*Primary Examiner* — Terrance Kenerly
(74) *Attorney, Agent, or Firm* — Rankin, Hill & Clark LLP

(57) ABSTRACT

Provided herein is a linear motor in which a back yoke can readily be mounted onto a plurality of linear motor units. The back yoke is constituted from a back yoke assembly including a surrounding portion that entirely surrounds six linear motor units. The back yoke works to form part of respective magnetic circuits of the six linear motor units. The back yoke assembly includes first and second divided assemblies and five partition wall portions. The first and second divided assemblies are each formed by press working a magnetic plate made of silicon steel.

8 Claims, 20 Drawing Sheets

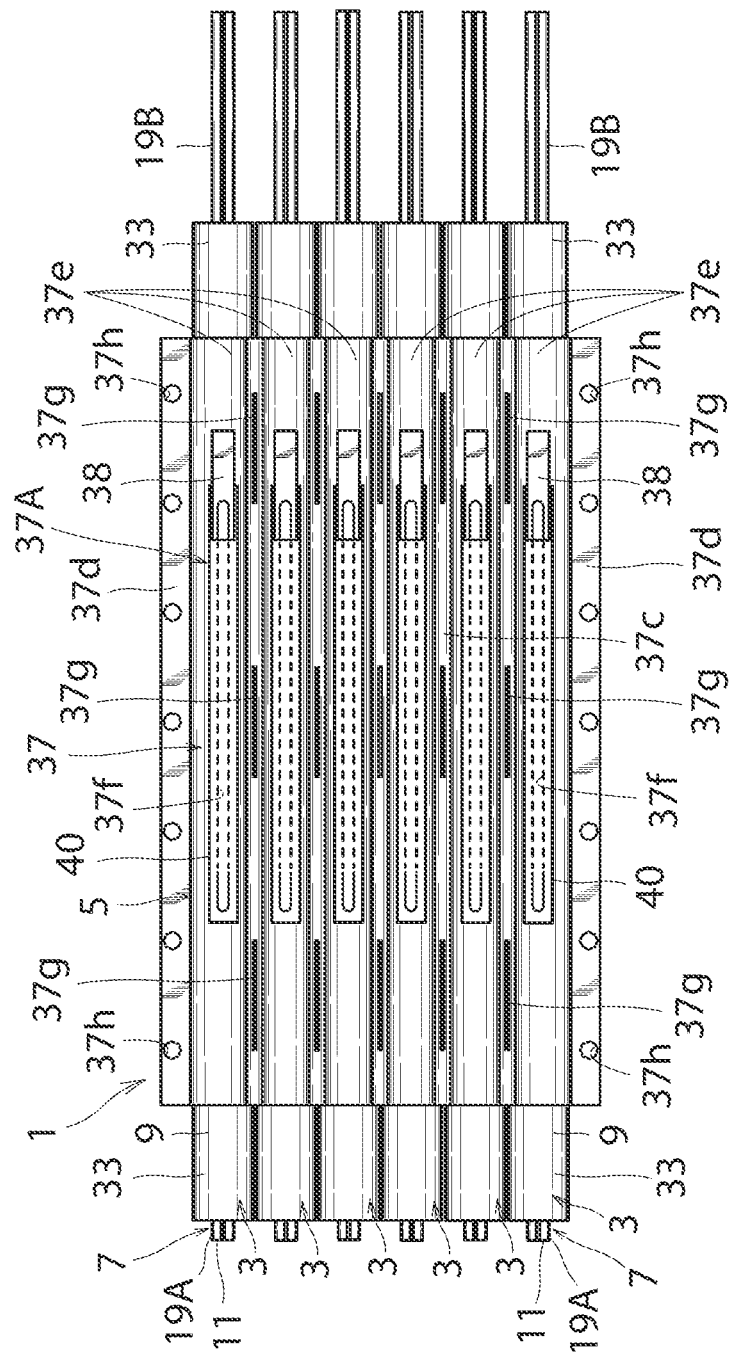

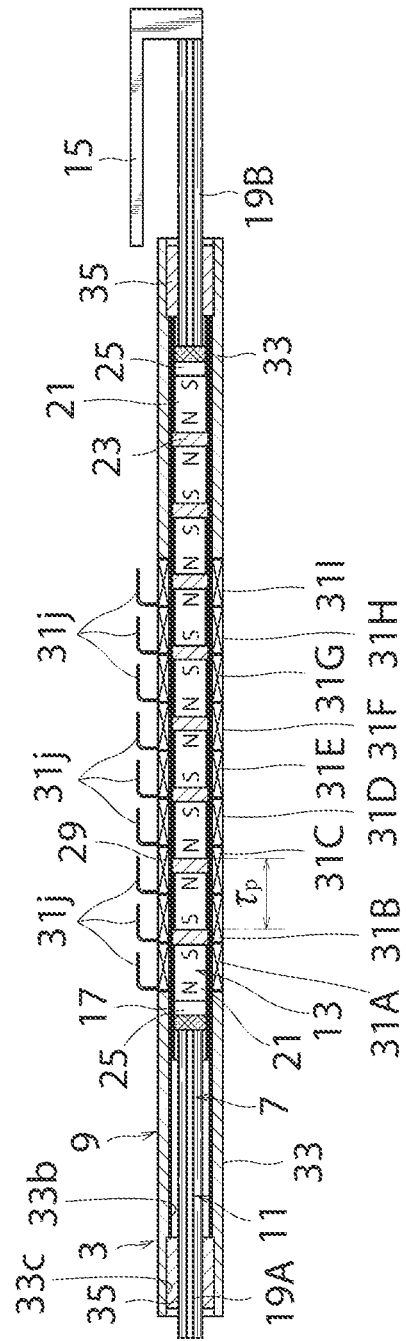

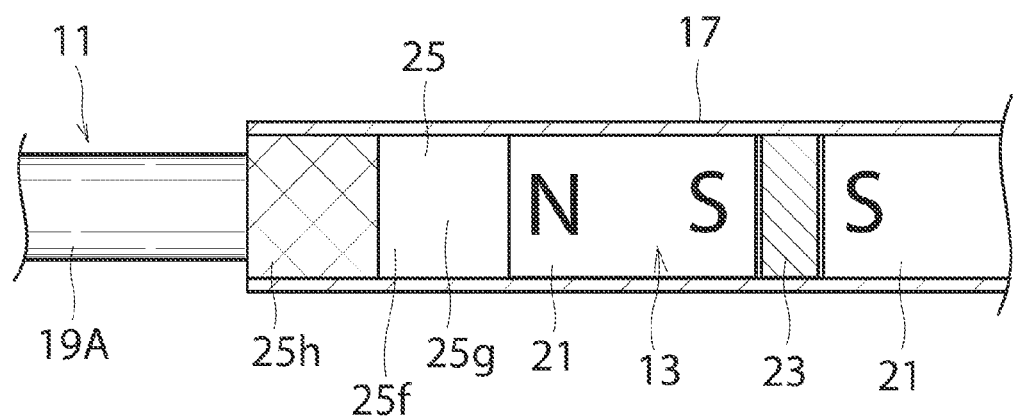
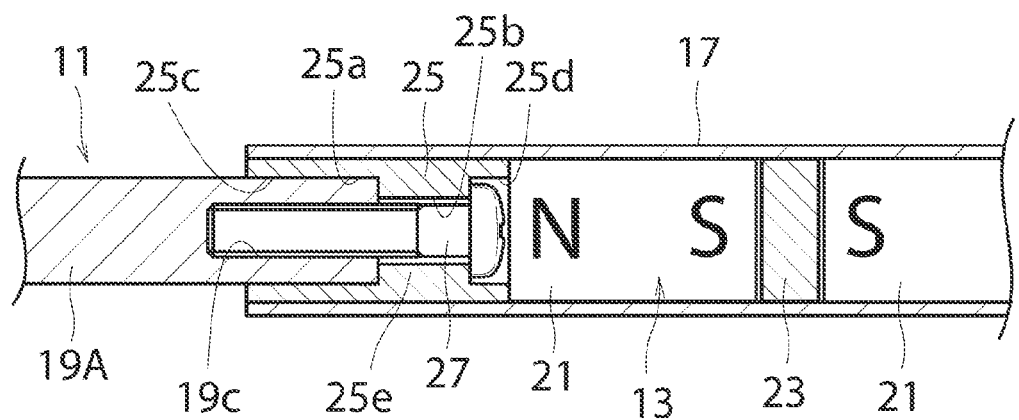

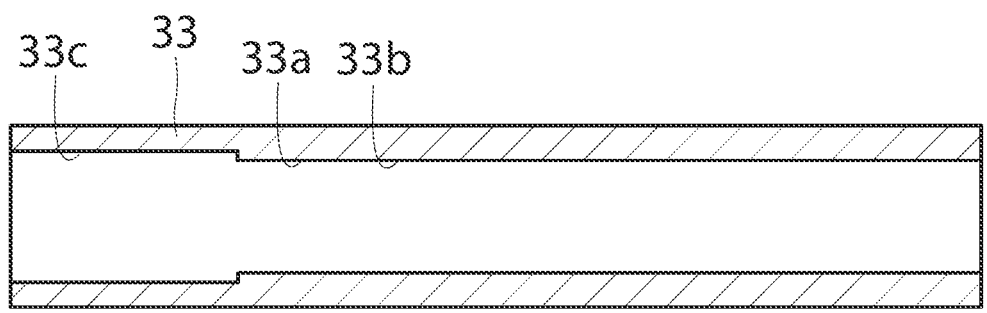

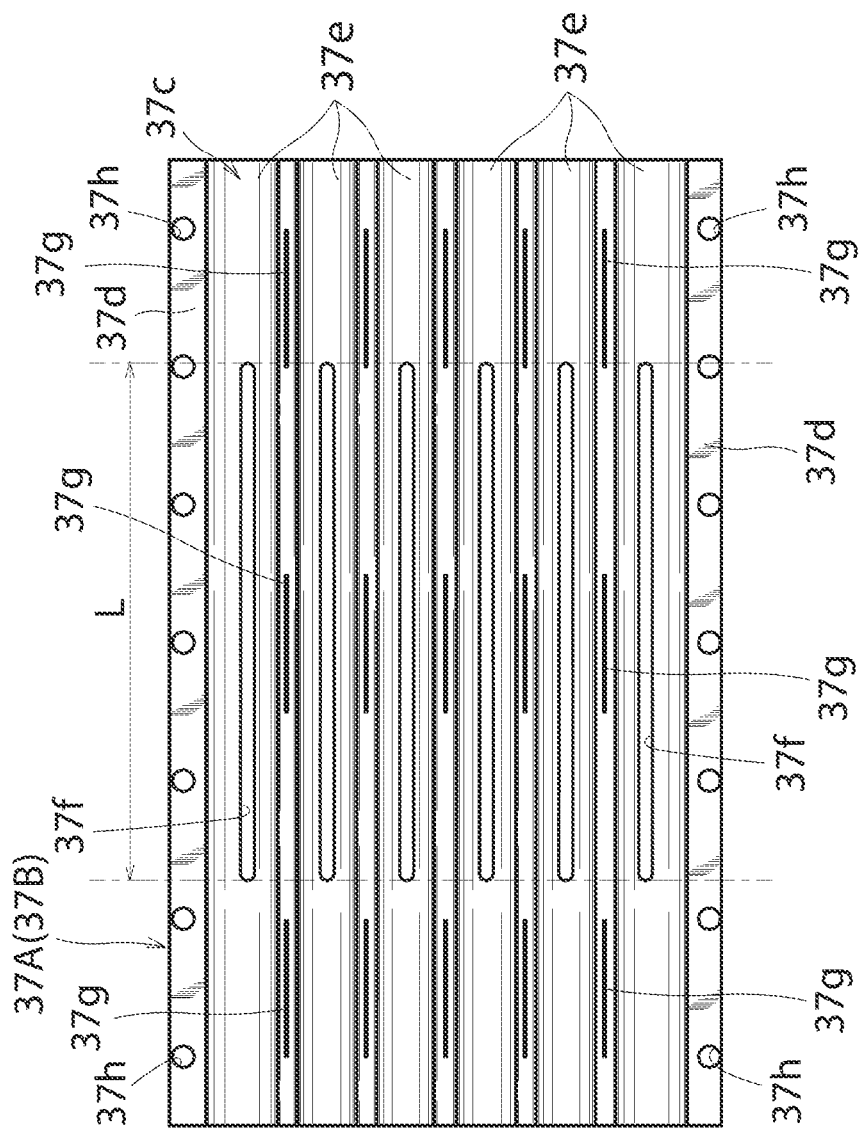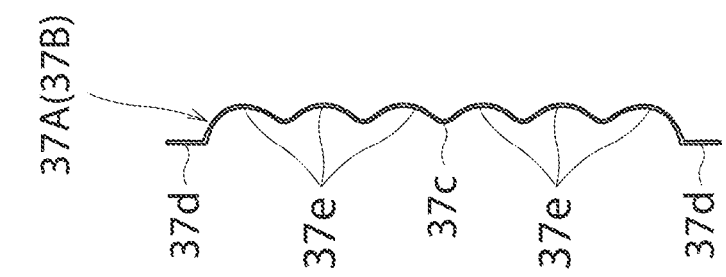

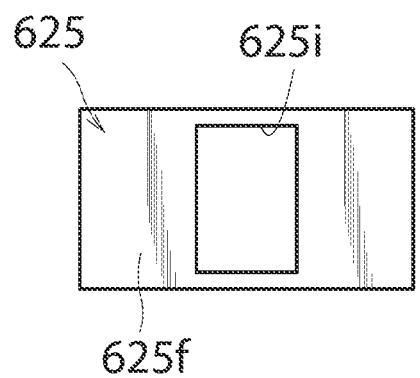
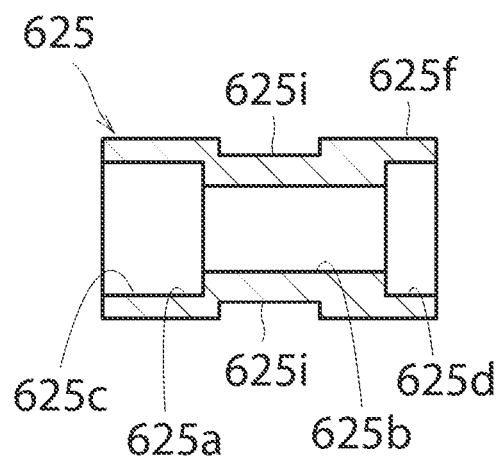

ated to the direct drive shaft, the stator having a plurality of excitation windings each formed of a winding conductor wound in a coil such that the mover reciprocates in an inner space defined inside the excitation windings. The linear motor units are arranged such that the respective direct drive shafts of the liner motor units are juxtaposed in parallel. A back yoke is disposed outside the respective stators of the linear motor units to partly form respective magnetic circuits of the linear motor units. The back yoke is constituted from a plurality of pipes made of magnetic material. The linear motor units provided with the back yoke are supported, being sandwiched between a block frame and a cover.

The manufacturing process of such conventional linear motor is complicated since the back yoke formed of a plurality of pipes must be mounted on a plurality of linear motor units. In addition, a block frame and a cover are necessary to support the linear motor units. Consequently, the linear motor is inevitably large in volume and heavy in weight.

SUMMARY OF THE INVENTION

An object of the present invention is to provide a linear motor in which a back yoke can readily be mounted to a plurality of linear motor units.

Another object of the present invention is to provide a linear motor of which the volume and weight can be reduced.

A linear motor of the present invention comprises a plurality of linear motor units and a back yoke. The linear motor units each include a mover and a stator. The mover includes a direct drive shaft capable of reciprocating in an axial direction or a direction an axial line of the shaft and a permanent magnet array formed of a plurality of permanent magnets mounted to the direct drive shaft. The stator has a plurality of excitation windings disposed along the axial line of the direct drive shaft. The excitation windings are each formed of a winding conductor wound in a coil such that the mover reciprocates in an inner space defined inside the excitation windings. The linear motor units are arranged such that the respective direct drive shafts of the liner motor units are juxtaposed in parallel. The back yoke is disposed outside the respective stators of the linear motor units to partly form respective magnetic circuits of the linear motor units. The back yoke is constituted from a back yoke assembly made of magnetic material and including a surrounding portion that entirely surrounds the linear motor units.

If the back yoke is constituted from a back yoke assembly including a surrounding portion that entirely surrounds the linear motor units as with the present invention, it is easy to mount the back yoke onto the linear motor units simply by mounting the back yoke assembly for the entirety of linear motor units. The back yoke of the present invention may simply be mounted to a fitting member provided outside the linear motor. Unlike the conventional linear motors, it is not necessary to use a block frame and a cover to support the linear motor units. Thus, the linear motor of the present invention may be downsized in volume and weight.

The back yoke assembly preferably has one or more partition wall portions fixed inside the surrounding portion to partition adjacent two of the linear motor units and form a common magnetic circuit therebetween. In this configuration, a common magnetic circuit may readily be formed between two adjacent linear motor units.

The surrounding portion of the back yoke assembly may include a first divided assembly and a second divided assembly that are splittably combined such that abutting surfaces of the first and second assemblies extend in a direction where the linear motor units are arranged or juxtaposed. The one or more partition wall portions may be fixed to the first and second assemblies via fitting structures. Thus, the back yoke assembly may readily be assembled merely by combining the first and second divided assemblies and the one or more partition wall portions.

The first and second assemblies preferably have the same dimension and shape. In this case, a divided assembly of one sort can be used as either of the first and second divided assemblies.

The first and second divided assemblies may each be formed by press working a magnetic plate. Even if the shapes of the first and second divided assemblies are complicated, the first and second divided assemblies may readily be formed. Since the divided assemblies are each formed by press working a magnetic plate, the linear motor may be downsized in volume and weight.

Generally, lead wires are connected to the excitation windings to supply electric power to the excitation windings. At least one of the first and second divided assemblies preferably has a through hole formed for the lead wires to pass therethrough. With this, the lead wires may readily be guided to the outside.

The through hole may be formed in a slit extending in the axial direction. In this case, a dimension between the center of the through hole in the axial direction and the center of the first or second assembly in the axial direction is preferably in a range of $\frac{1}{4}\tau p$ to $\frac{1}{2}\tau p$ where $\tau p$ denotes a pitch of the permanent magnets in the permanent magnet array; and a length of the through hole in the axial direction is preferably in a range of $(n-\frac{1}{2})\tau p$ to $(n+\frac{1}{2})\tau p$ where n stands for a natural number and $\tau p$ for a pitch of the permanent magnets in the permanent magnet array. With these definitions, the influence of cogging torque caused due to end portions of the slit may be reduced.

The stator may include an insulating pipe inside of which the mover is disposed and on which the excitation windings are mounted. In this configuration, a pair of end brackets are fixed at axial ends of the insulating pipe. The end brackets each have a bearing fixed therein to support the end of the direct drive shaft movably in the axial direction and unrotatably in a circumferential direction. The back yoke assembly is preferably disposed across the pair of end brackets. With this, a plurality of excitation windings may readily be disposed simply by winding a winding conductor around the insulating pipe to form the excitation windings. Further, the back yoke assembly may securely be fixed onto the linear motor units.

Each direct drive shaft may include a cylindrical shaft body housing the permanent magnet array formed of the plurality of permanent magnets and a pair of shaft end members connected to axial ends of the shaft body and supported by the bearings. In the permanent magnet array, the permanent magnets are arranged such that magnetic poles having the same polarity are opposed to each other. Preferably, in this configuration, the shaft body and the pair of shaft end members are coupled by coupling pieces; the shaft body is fixedly fitted with an outer peripheral portion of each coupling piece; and the shaft end members are fixedly fitted into an inner peripheral portion of each coupling piece. With this, the shaft body and the pair of shaft end members may easily be connected to each other simply via the coupling pieces.

The outer peripheral portion of each coupling piece has a smooth surface portion located to the center of the shaft body in a longitudinal direction of the shaft body and a rough surface portion located away from the center of the shaft body in the longitudinal direction. End portions of the shaft body are preferably disposed to be in contact with both of the smooth and rough surface portions. In this manner, the shaft body and the coupling pieces may securely be fixed while maintaining the concentricity of the shaft body and the coupling pieces.

The outer peripheral portion of each coupling piece may have a plurality of concave portions formed therein; and the end portions of the shaft body may have a plurality of convex portions formed therein to be fitted with the concave portions. In this configuration, the coupling pieces and the shaft body may tightly be fixed by fitting the convex portions of the shaft body into the concave portions of the coupling pieces.

BRIEF DESCRIPTION OF THE DRAWINGS

These and other objects and many of the attendant advantages of the present invention will readily be appreciated as the same becomes better understood by reference to the following detailed description when considered in connection with the accompanying drawings.

FIG. 2 is a right side view of the linear motor of FIG. 1.

FIG. 3 is a cross sectional view of one of linear motor units of the linear motor of FIG. 1.

FIG. 4 is an enlarged partial view of the linear motor unit of FIG. 3.

FIG. 5 is a cross sectional view of a coupling piece and a shaft end member of FIG. 4.

FIG. 7 is a cross sectional view of an end bracket used in the linear motor of FIG. 1.

FIGS. 8A and 8B are a front view and a right side view, respectively, of a first divided assembly (or a second divided assembly) used in the linear motor of FIG. 1.

FIGS. 21A and 21B are a plan view and a cross sectional view, respectively, of a coupling piece used in the mover of FIG. 20.

DETAILED DESCRIPTION OF THE EMBODIMENTS

Now, embodiments of the present invention will be described below in detail with reference to the accompanying drawings.

Figure 1:
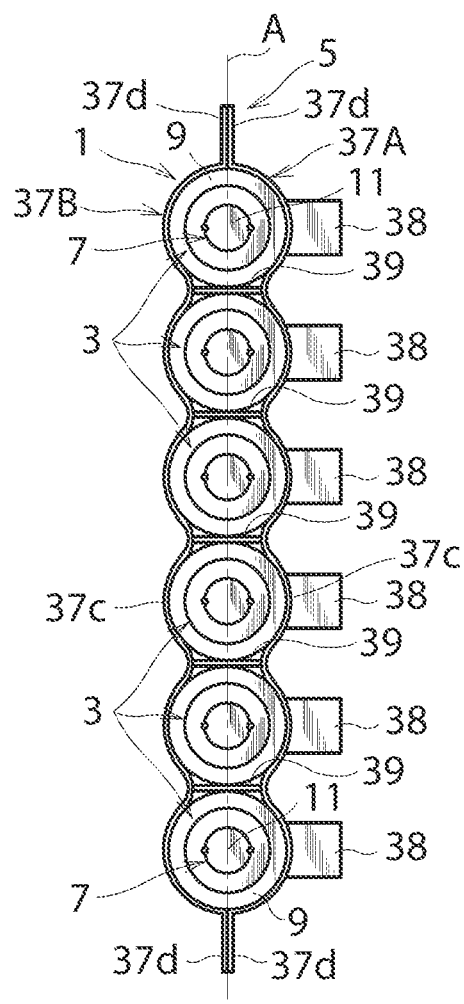
FIG. 1 is a front view of a liner motor according to an embodiment of the present invention.

FIG. 1 and FIG. 2 are a front view and a right side view, respectively, of a linear motor according to an embodiment of the present invention. As shown in these figures, a linear motor 1 of this embodiment includes six linear motor units 3 and a back yoke 5. Each linear motor unit 3 includes a mover 7 and a stator 9 as shown in FIG. 3. FIG. 3 is a cross sectional view of one linear motor unit 3, and a pair of shaft end members 19A, 19B, permanent magnets 21, and coupling pieces 25 are shown in a plane for easy understanding. The mover 7 includes a direct drive shaft 11, a permanent magnet array 13, and a linear scale 15. The direct drive shaft 11 includes a shaft body 17 and a pair of shaft end members 19A, 19B, and is capable of reciprocating in an axial direction of the shaft. As shown in FIGS. 4 and 5, the shaft body 17 is formed of a cylindrical pipe made of non-magnetic stainless metal material. The permanent magnet array 13 is housed inside the shaft body 17. FIG. 4 is an enlarged partial view of FIG. 3. FIG. 5 is a cross sectional view of a coupling piece 25 and one shaft end member 19A of FIG. 4. The permanent magnet array 13 is formed of a plurality of columnar permanent magnets 21 which are disposed via a spacer 23 made of magnetic material such as iron. The permanent magnets 21 are arranged in the axial direction such that magnetic poles having the same polarity of two adjacent permanent magnets are opposed to each other.

As shown in FIG. 3, the pair of shaft end members, 19A, 19B are elongate or slender columns in shape. The shaft end members 19A, 19B are connected to axial ends of the shaft body 17 and supported by a pair of bearings 35 slidably in a thrust direction. A linear scale 15 is mounted to the shaft end member 19B shown on the right side of FIG. 3. The linear scale 15 is opposed to a linear sensor, not illustrated, which is disposed outside the linear motor. The linear scale 15 and the linear sensor jointly form a position detecting device to detect a position of the mover 7. In FIG. 2, the linear scale is omitted. The pair of shaft end members 19A, 19B are coupled to the shaft body 17 via the coupling pieces 25 as shown in FIGS. 4 and 5. The coupling pieces 25 are made of metal material such as iron and stainless metal material. Each coupling piece 25 has a hollow portion 25a inside thereof as shown in FIG. 5. The hollow portion 25a has a small-diameter portion 25b and two large-diameter portions 25c, 25d having a larger diameter than the small-diameter portion 25b and located on either side of the small-diameter portion 25b. In other words, a projecting portion 25e extending radially inwardly is formed in the vicinity of the axial center of hollow portion 25a. As shown in FIG. 4, an outer peripheral portion 25f of each coupling piece 25 has a smooth surface portion 25g having a smooth surface and located to the center of the shaft body 17 in a longitudinal direction of the shaft body 17 and a rough surface portion 25h having a rough surface and located away from the center of the shaft body 17 in the longitudinal direction. The rough surface portion 25h is formed by scratching the surface with a working tool to cause pricks of approximately 0.1 to 0.3 mm in height on the surface. End portions of the shaft body 17 are disposed such that inner peripheral surfaces of the end portions are in contact with both of the smooth and rough surface portions 25g, 25h. In this embodiment, an adhesive is applied to the outer peripheral portion 25f of each coupling piece 25 and then the coupling pieces 25 are pressed into the shaft body 17. Thus, the shaft body 17 and the coupling pieces 25 are tightly fixed by means of plastic deformation and adhesion. As shown in FIG. 5, the pair of shaft end members 19A, 19B are fixedly fitted into the large-diameter portions 25c of the inner peripheral portions of the coupling pieces 25. The shaft end members 19A, 19B each have at ends thereof a hole portion 19c formed with a female screw. A male screw 27 disposed inside the hollow portion 25a of each coupling piece 25 is screwed into the female screw formed in the hole portion 19c. Thus, the shaft end embers 19A, 19B are tightly fixed to the coupling pieces 25.

Figure 6A:
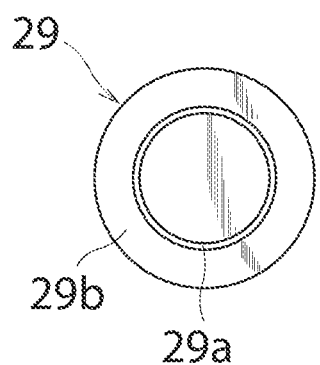
FIGS. 6A and 6B are a front view and an enlarged partial view as viewed from the right side, respectively, of an insulating pipe mounted with excitation windings used for the linear motor of FIG. 1.
Figure 6B:
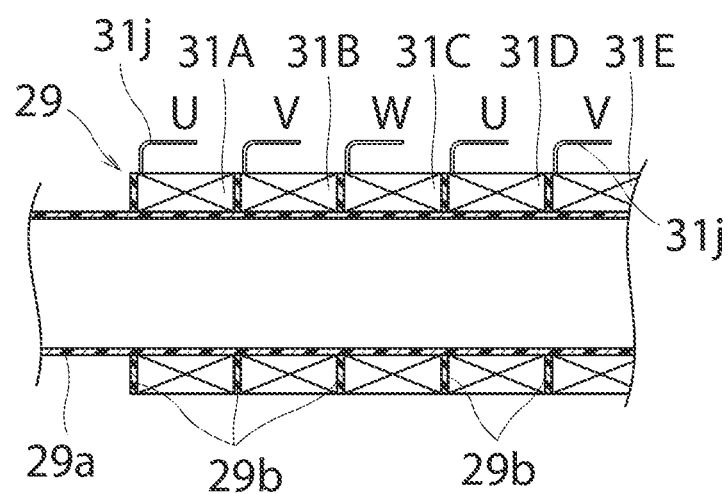

As shown in FIG. 3, the stator 9 includes an insulating pipe 29, a plurality of excitation windings 31A to 31I, a pair of end brackets 33, and a pair of bearings 35. The insulating pipe 29 is made from stainless metal material coated with glass epoxy or insulating paint, or the like. As shown in FIGS. 6A and 6B, the insulating pipe 29 includes a cylindrical body 29a having a thickness of approximately 0.2 mm and ten annular partition walls 29b extending radially from the body 29a. The excitation windings 31A to 31I are each disposed between two adjacent partition walls 29b. The excitation windings 31A to 31I are each formed of a winding conductor wound in a coil around a portion of the body 29a of the insulating pipe 29 between two adjacent partition walls 29b. Three consecutive excitation windings 31A to 31I are grouped as one unit. Excitation currents having three phases shifted by 120° in terms of electrical angle are supplied to the unitized excitation windings. As a result, the excitation currents flow through the excitation windings 31A to 31I in the order of U-phase, V-phase, W-phase, U-phase, V-phase, W-phase, U-phase, V-phase, and W-phase. A pair of lead wires 31j are connected to each of the excitation windings 31A to 31I to supply electric power to the excitation windings.

As cross-sectionally shown in FIG. 7, the pair of end brackets 33 are cylindrical in shape and are formed of metal material such as aluminum or workable plastic material. Each end bracket 33 has a hollow portion 33a inside thereof. The hollow portion 33a has a small-diameter portion 33b and a large-diameter portion 33c having a larger diameter than the small-diameter portion 33b. End portions of the insulating pipe 29 are fixedly fitted into the small-diameter portions 33b of the end brackets 33. The bearings 35 are fixedly fitted into the large-diameter portions 33c of the end brackets 33. As shown in FIG. 3, the pair of bearings 35 are respectively fixed in the pair of end brackets 33 to support both ends of the direct drive shaft 11 of the mover 7 slidably in the thrust direction or axial direction and unrotatably in the circumferential direction.

Returning to FIGS. 1 and 2, in the linear motor mentioned above, six direct drive shafts 11 of the linear motor units 3 are juxtaposed in parallel. Six linear motor units 3 are surrounded or wrapped by the back yoke 5.

The back yoke 5 is disposed outside the respective stators 9 of the six linear motor units 3 to partly form the respective magnetic circuits of the six linear motor units 3. The back yoke 5 is constituted from a back yoke assembly including a first divided assembly 37A and a second divided assembly 37B and five partition wall portions 39. The first and second divided assemblies 37A, 37B have the same dimension and shape, and are formed by press working a silicon steel plate or SPCC magnetic plate having a thickness of 0.5 to 1.0 mm. Referring to FIGS. 8A and 8B, a front view and a right side view of one of the divided assemblies that have the same dimension and shape, the structure of the divided assembly is described below. As shown in FIGS. 8A and 8B, the first and second divided assemblies 37A, 37B each have an assembly body 37c and a pair of mounting plate portions 37d disposed on either side of the assembly body 37c in a direction perpendicular to the axial direction of the assembly body 37c. The assembly body 37c includes six arc portions 37e. The arc portions 37e are opposed respectively to portions of the excitation windings 31A to 31I of the stator 9. A through hole 37f is formed in the center of each of the six arc portion 37e for the lead wires 31j connected to the excitation windings 31A to 31I (See FIG. 3) to pass therethrough. Each through hole 37f is formed in a slit located in the middle of the axial line of the direct drive shaft 11 and extending in the axial direction. The length of the silt as measured in the axial direction is in a range of $(n-\frac{1}{2})\tau p$ to $(n+\frac{1}{2})\tau p$ where n stands for a natural number and $\tau p$ for a pitch of the permanent magnets in the permanent magnet array (See FIG. 3). The dimension between the center of the through hole 37f in the axial direction and the center of the first or second assembly 37A, 37B in the axial direction is preferably in a range of $\frac{1}{4}\tau p$ to $\frac{1}{2}\tau p$ where $\tau p$ denotes a pitch of the permanent magnets in the permanent magnet array. In this embodiment, a bundle 38 of the lead wires 37j connected to the excitation windings 31A to 31I is guided out from one end portion of each through hole 37f as shown in FIG. 2. A major part of the lead wires 31j and the through hole 37f is covered by a cover made of insulating material or resin molding material 40. Three through holes 37g are formed between adjacent two of the six arc portions 37e to support the partition wall portions 39. The three through holes 37g are each formed in a slit extending in the axial direction of the direct drive shaft 11 and disposed at an equidistant interval in the axial direction. The pair of mounting plate portions 37d are elongate flat plates in shape. Seven through holes 37h are formed in each mounting plate portion 37d for mounting the linear motor onto some external location. The pair of mounting plate portions 37d of the first divided assembly 37A are abutted onto the pair of mounting plate portions 37d of the second divided assembly 37B. Thus, as shown in FIG. 1, the first and second divided assemblies 37A, 37B are combined such that the abutting surfaces A extend in a direction where the six linear motor units 3 are disposed or juxtaposed. The first and second divided assemblies 37A, 37B, six linear motor nits 3, and five partition wall portions 39 are disposed in given locations and integrally assembled by an adhesive made of epoxy resin or resin molding. As shown in FIG. 2, the first and second divided assemblies combined together are disposed between the respective pairs of end brackets 33 of six linear motor units 3. In this embodiment, the first and second divided assemblies 37A, 37B jointly form a surrounding portion of the back yoke 5 that entirely surrounds the six linear motor units 3.

Figure 9:
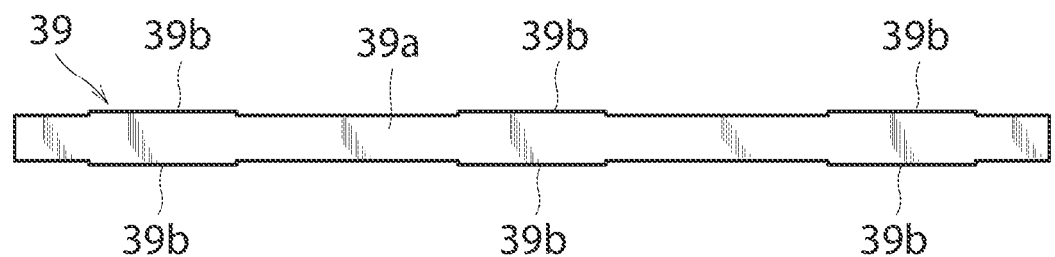
FIG. 9 is a plan view of a partition wall portion of the linear motor of FIG. 1.

The five partition wall portions 39 are each formed by press working a silicon steel plate or SPCC magnetic plate having the same thickness as the first and second divided assemblies 37A, 37B as shown in FIG. 9. The partition wall portions 39 are elongate plates in shape. Each partition wall portion 39 includes a wall body 39a and six protrusions 39b. Three protrusions 39b protrude from one side of the wall body 39a and the other three protrusions 39b protrude from the other side of the wall body 39a. The partition wall portions 39 are each disposed between two adjacent linear motor units 3.

Three protrusions 39*b* are fitted into the through holes 37*g* of the first divided assembly 37A and the other three protrusions 39*b* are fitted into the through holes 37*g* of the second divided assembly 37B. Thus, each partition wall portion 39 partitions two adjacent linear motor units 3 to form a common magnetic circuit therebetween.

In the linear motor of this embodiment, mounting the back yoke 5 may readily be done simply by combining one pair of back yoke assemblies, specifically, the first and second divided assemblies 37A, 37B and five partition wall portions 39 for the entirety of six linear motor units 3. Further, the liner motor may readily be mounted in an external location merely by mounting plate portions 37*d* to an externally provided mounting member. Thus, unlike with conventional linear motor units, it is not necessary to use additional members such as a block frame and a cover for bunching a plurality of linear motor units. As a result, the linear motor may be downsized in volume and weight.

Figure 10:
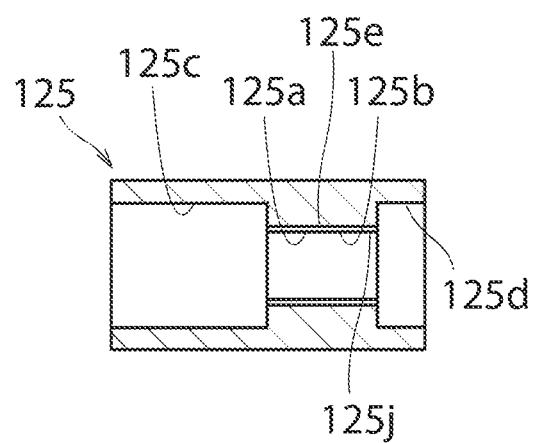
FIG. 10 is a cross sectional view of another coupling piece usable for the linear motor of the present invention.
Figure 11:
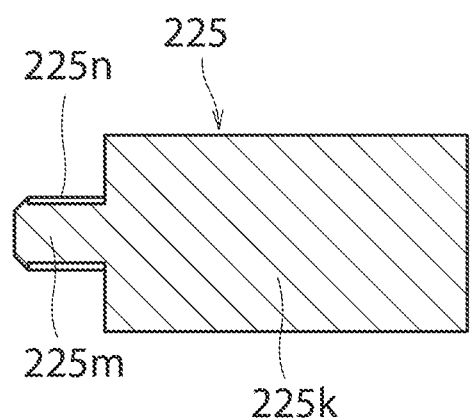
FIG. 11 is a cross sectional view of still another coupling piece usable for the linear motor of the present invention.

In the linear motor of the present invention, various types of coupling pieces cross-sectionally shown in FIGS. 10 and 11 may be used in addition to those shown in FIGS. 4 and 5. The coupling pieces shown in FIG. 10 are the same in structure as those shown in FIGS. 4 and 5 except a projecting portion provided in a hollow portion of each coupling piece. The counterparts except the projecting portion of FIG. 10 are allocated reference numbers defined by adding 100 to those allocated to the parts of FIGS. 4 and 5, and the explanation of the counterparts is omitted. In this embodiment, a projecting portion 125*e* of each coupling piece 125 is formed with a female screw 125*j*. The male screw disposed inside a hollow portion 125*a* of the coupling piece 125 (See the screw 27 in FIG. 5) is screwed into the female screw 125*j* of the projecting portion 125*e*.

A coupling piece 225 shown in FIG. 11 does not have a hollow portion. The parts of the coupling piece 225 of FIG. 11 are allocated reference numbers in the 200's. The coupling piece 225 includes a body 225*k* and a pair of protrusions 225*m* protruding from the body 225*k* toward the shaft end member (See the shaft end member 19A of FIG. 5). The protrusions 225*m* are each formed with a male screw 225*n*. The male screw 225*n* is screwed into a female screw formed in a hole at either end portion of the pair of shaft end members. When using the coupling pieces 225, the pair of shaft end members may be fixed to the coupling pieces 225 without using screws.

Figure 12:
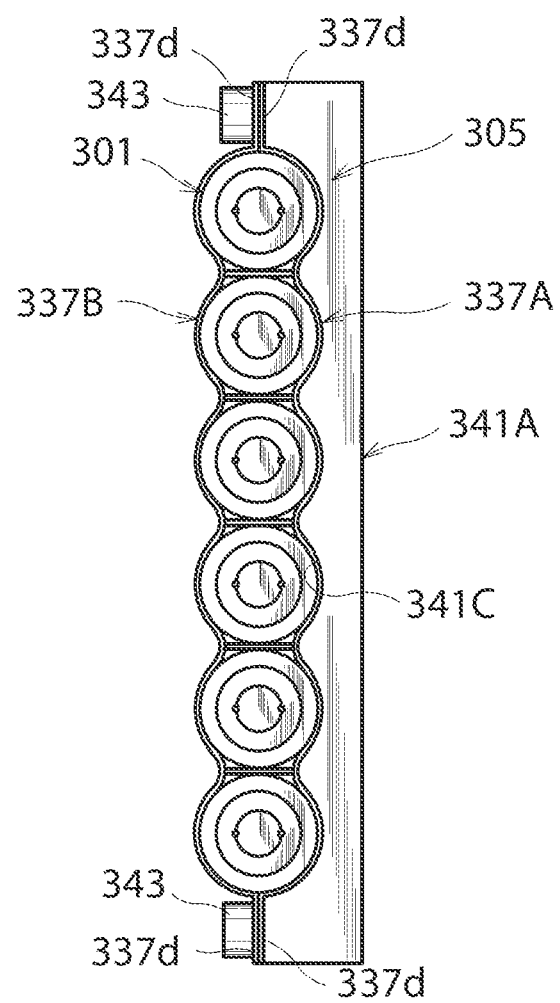
FIG. 12 is a front view of a linear motor according to another embodiment of the present invention.
Figure 13:
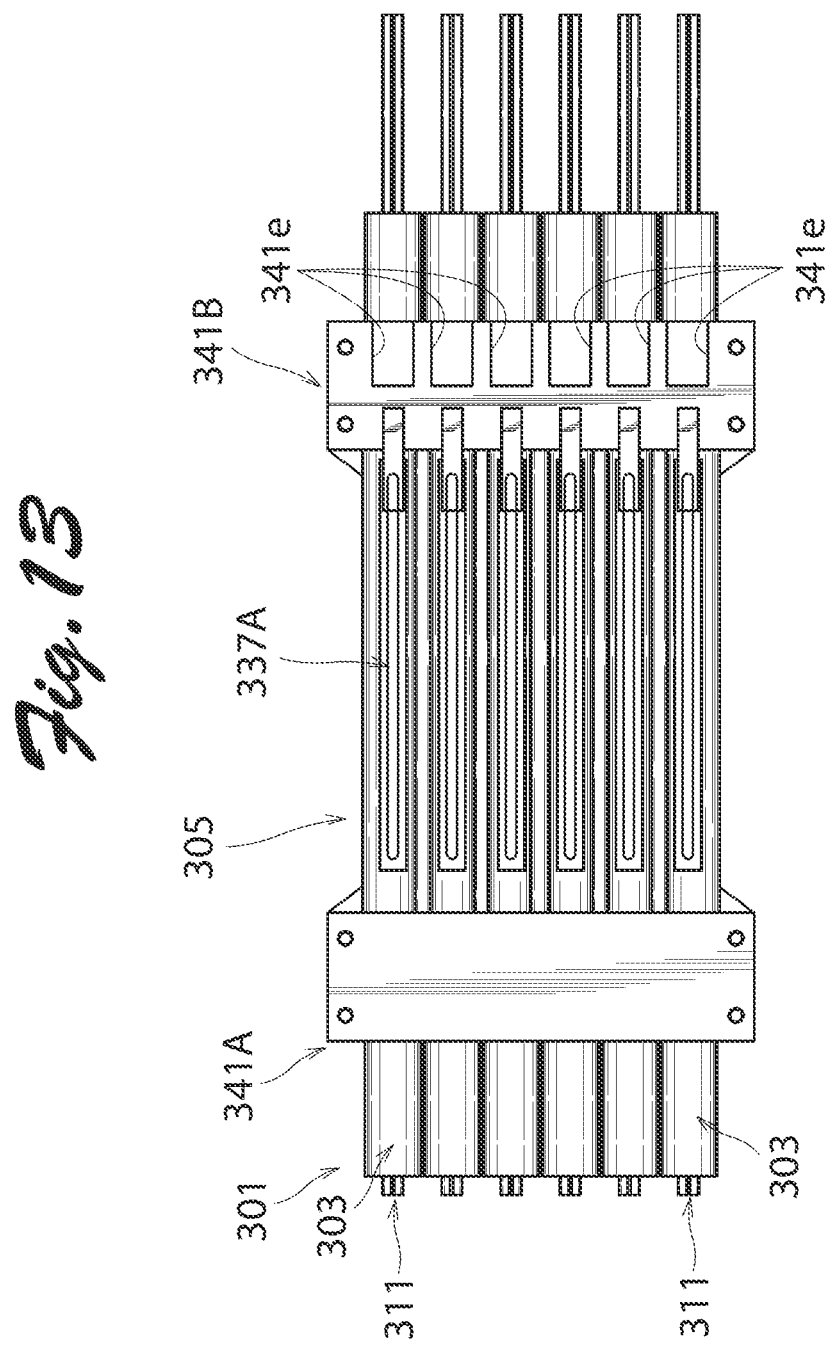
FIG. 13 is a right side view of the linear motor of FIG. 12.
Figure 14:
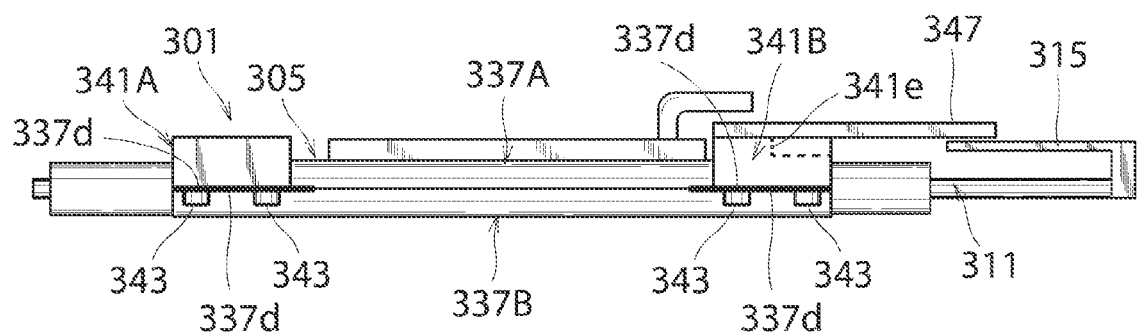
FIG. 14 is a bottom plan view of the linear motor of FIG. 12.

FIGS. 12 to 14 are a front view, a right side view, and a bottom plan view of a linear motor according to another embodiment of the present invention. FIG. 13 shows the situation where a linear scale 315 and a linear sensor 347 have not been mounted yet. The linear motor of this embodiment is the same in structure as that shown in FIGS. 1 to 9 except a back yoke. The counterparts except the back yoke of this embodiment are allocated reference numbers defined by adding 300 to those of the parts shown in FIGS. 1 and 2, and the explanation of the counterparts is omitted. The back yoke 305 is constituted from a first divided assembly 337A and a second divided assembly 338B. First and second mounting members 341A, 341B are mounted onto the first divided assembly 337A for mounting a linear motor 301 in some external location. The first and second mounting members 341A, 341B are each formed of aluminum block and shaped substantially in a rectangular parallelepiped or a rectangular solid. Surfaces 341*c* of the first and second mounting members 341A, 341B opposed to the back yoke 305 are shaped along an outer surface of the back yoke 305 to be in contact with the back yoke 305. The mounting members 341A, 341B are fixed onto the first and second divided assemblies 337A, 337B by screws 343. The screw 343 penetrate through holes formed in the mounting plate portions 337*d* of the first and second divided assemblies 337A, 337B and screw into female screws formed in the first and second mounting members 341A, 341B. The second mounting member 341B shown in the right side of FIG. 13 is formed with six concave portions 341*e*. When the direct drive shaft 11 moves toward the left side in FIG. 14, an end of the linear scale 315 enters into the concave portion 341*e*. The linear sensor 347 is mounted on the second mounting member 341B so as to be opposed to the linear scale 315 as shown in FIG. 14.

Figure 15:
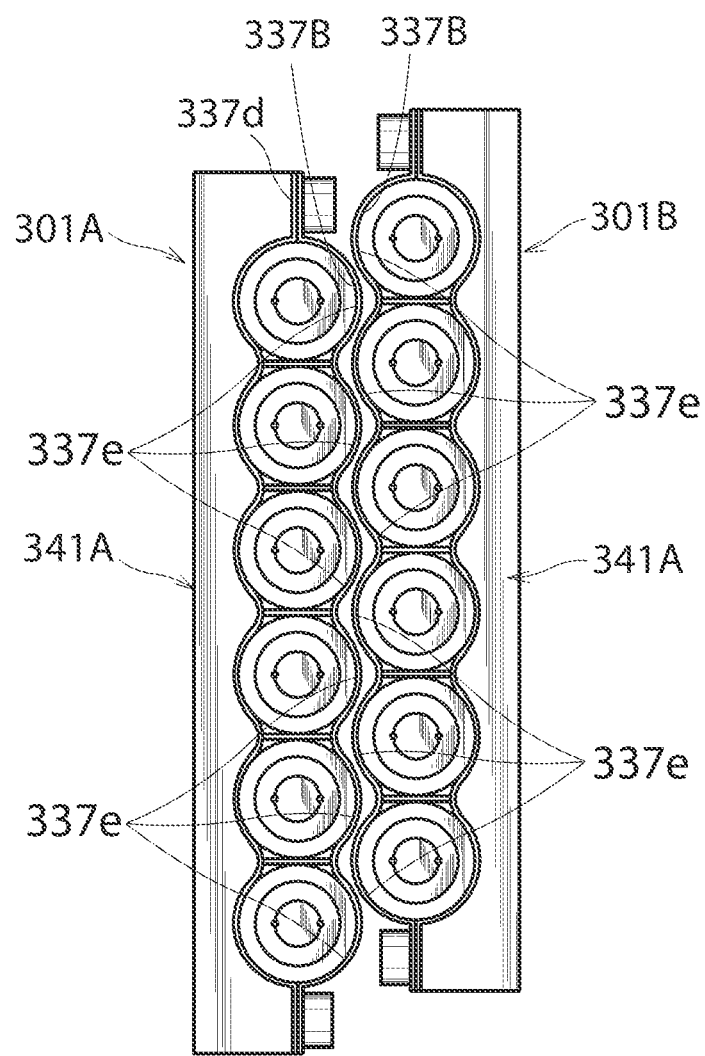
FIG. 15 is a front view showing an example of using two linear motors of FIGS. 12 to 14.

A plurality of linear motors of the present invention may jointly be used. FIG. 15 is a front view showing an example of using two linear motors of FIGS. 12 to 14. In this example, one linear motor 301A is opposed to the other linear motor 301B such that the second divided assembly 337B of the one linear motor 301A is opposed to that of the other linear motor 301B. A plurality of arc portions 337*e* of the second divided assembly 337B of the one linear motor 301A are opposed to a portion between two adjacent arc portions 337*e* out of a plurality arc portions 337*e* of the second assembly 337B of the other linear motor 301B.

Figure 16:
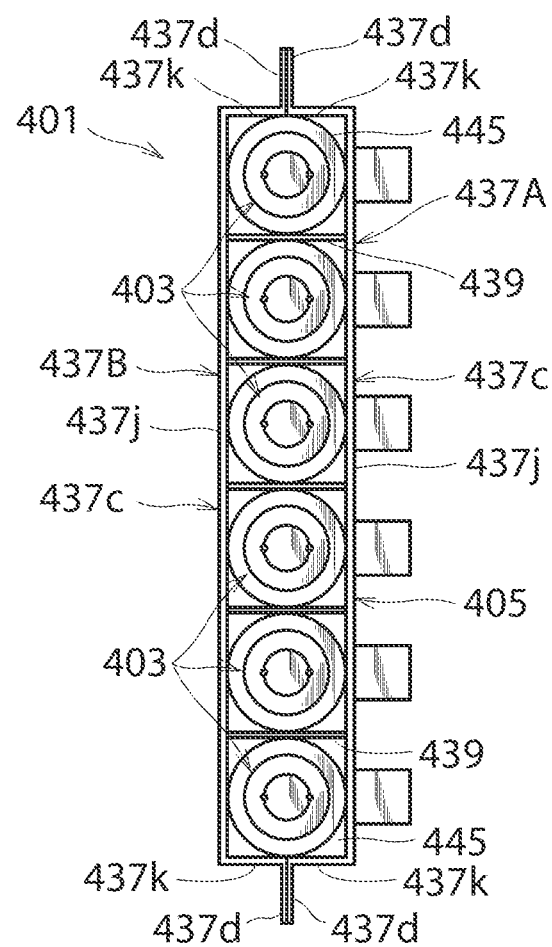
FIG. 16 is a front view of a linear motor according to still another embodiment of the present invention.
Figure 17:
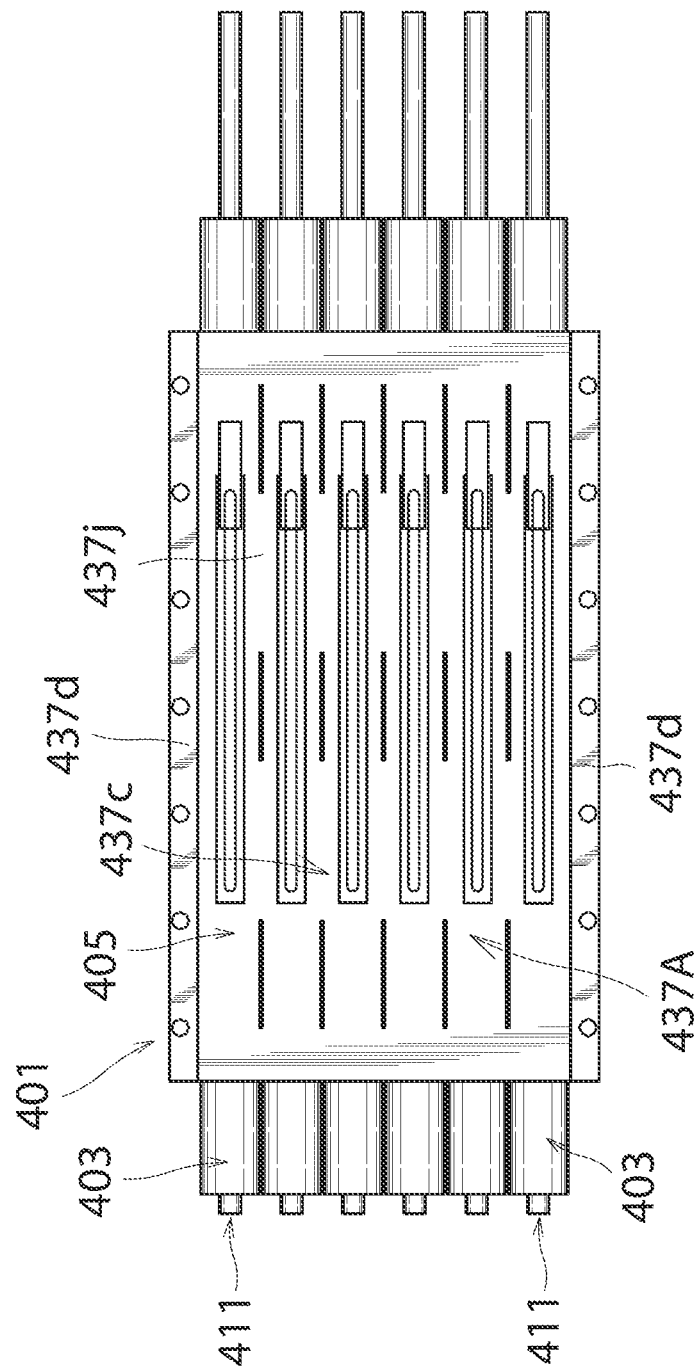
FIG. 17 is a right side view of the linear motor of FIG. 16.

FIGS. 16 and 17 are a front view and a right side view, respectively, of a linear motor according to still another embodiment of the present invention. The linear motor of this embodiment is the same in structure as that shown in FIGS. 1 to 9 except a back yoke. The counterparts except the back yoke of this embodiment are allocated reference numbers defined by adding 400 to those of the parts shown in FIGS. 1 to 9, and the explanation of the counterparts is omitted. First and second divided assemblies 437A, 437B of a back yoke 405 of this embodiment are the same in dimension and shape. The first and second divided assemblies 437A, 437B are formed by press working a silicon steel plate or SPCC magnetic plate having a thickness of 0.5 to 1.0 mm. The first and second divided assemblies 437A, 473B each have an assembly body 437*c* and a pair of mounting plate portions 437*d* disposed on either side of the assembly body 437*c*. The assembly body 437*c* includes a bottom wall portion 437*j* shaped in a rectangular flat plate and a pair of side wall portions 437*k* rising from two sides opposed to each other in a direction perpendicular to the axial direction of the bottom wall portion 437*j*.

The pair of mounting plate portions 437*d* have the same dimension and shape as the pair of mounting plate portions 37*d* as shown in FIG. 8. The pair of mounting plate portions 437*d* of the first divided assembly 437A are in contact with the pair of mounting plate portions 437*d* of the second divided assembly 437B.

Five partition wall portions 439 of the back yoke 405 have the same shape as the partition wall portions 39 as shown in FIG. 9. Each partition wall portion 439 is disposed between two adjacent linear motor units 403 and fixed to the first and second divided assemblies 437A, 437B.

In the linear motor 401 of this embodiment, gaps between the back yoke 405 and six linear motor units 403 are filled with an adhesive made of epoxy or a resin molding material 445. Since the bottom wall portions 437*j* of the assembly bodies 437*c* of the first and second divided assemblies 437A, 437B are each shaped in a rectangular flat plate, the first and second divided assemblies 437A, 437B may easily be formed, thereby readily manufacturing a linear motor.

Figure 18:
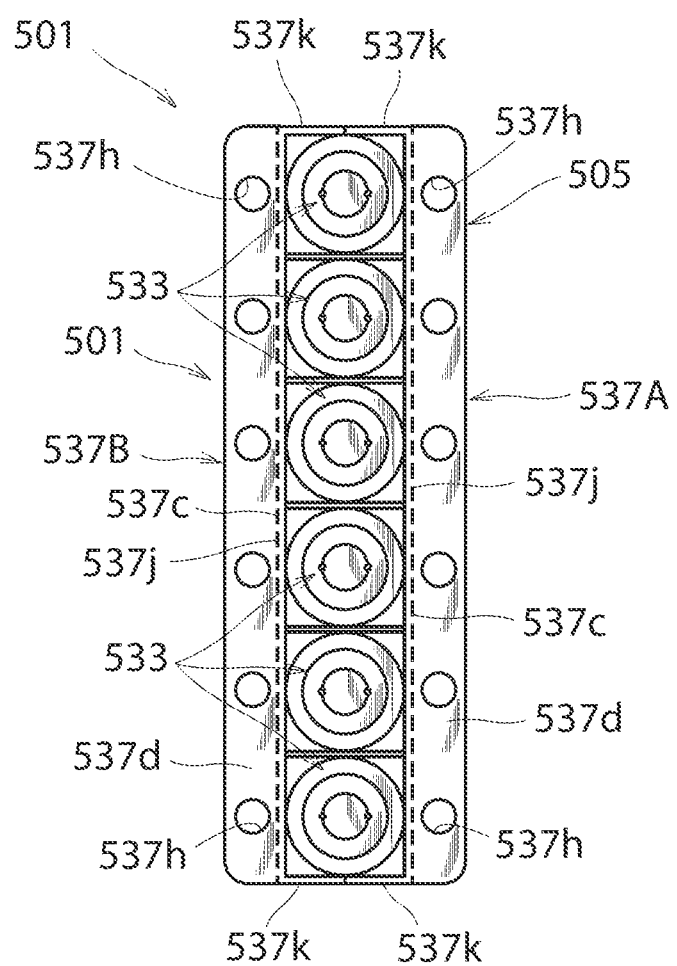
FIG. 18 is a front view of a linear motor according to yet another embodiment of the present invention.
Figure 19:
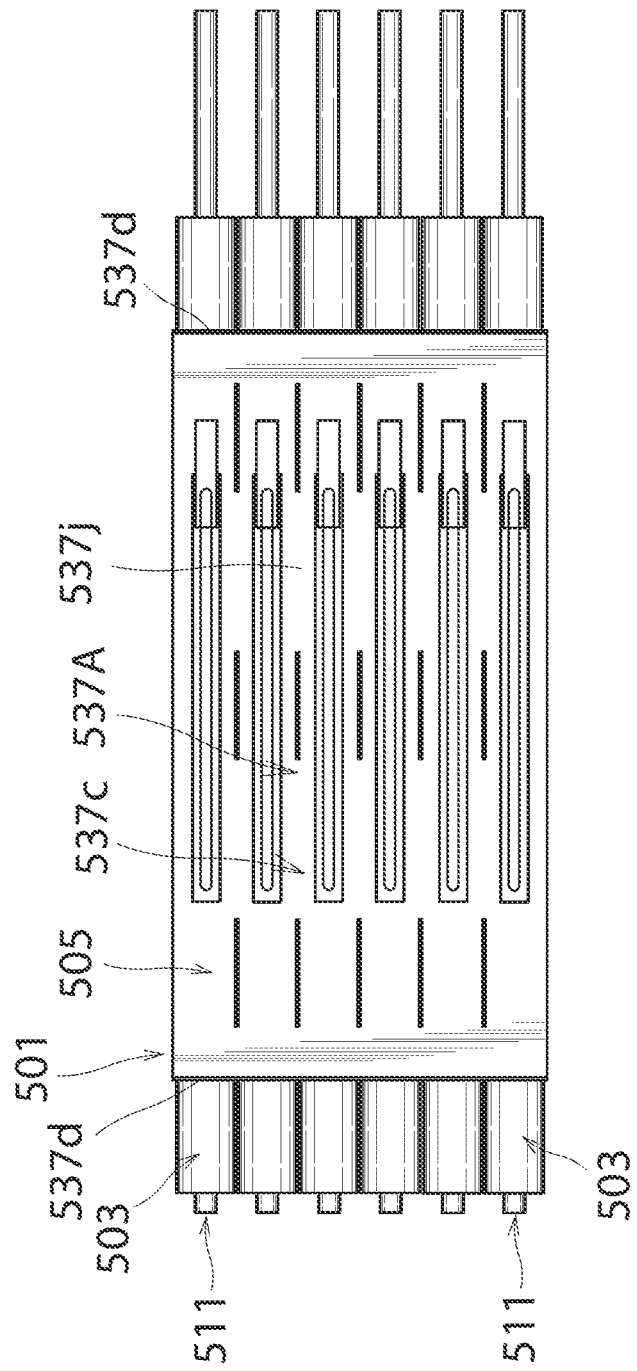
FIG. 19 is a right side view of the linear motor of FIG. 18.

FIGS. 18 and 19 are a front view and a right side view, respectively, of a linear motor according to yet another embodiment of the present invention. The linear motor of this embodiment is the same in structure as that shown in FIGS. 16 and 17 except a back yoke. The counterparts except the back yoke of this embodiment are allocated reference numbers defined by adding 100 to those of the parts shown in FIGS. 16 and 17 or adding 500 to those of the parts shown in FIGS. 1 to 9, and the explanation of the counterparts is omitted. First and second divided assemblies 537A, 537B of a back yoke 505 each have an assembly body 537c and a pair of mounting plate portions 537d disposed at axial ends of the assembly body 537c. The linear motor 501 of this embodiment and the linear motor 401 shown in FIGS. 16 and 17 may appropriately be chosen according to an external location where the linear motor is mounted.

Figure 20:
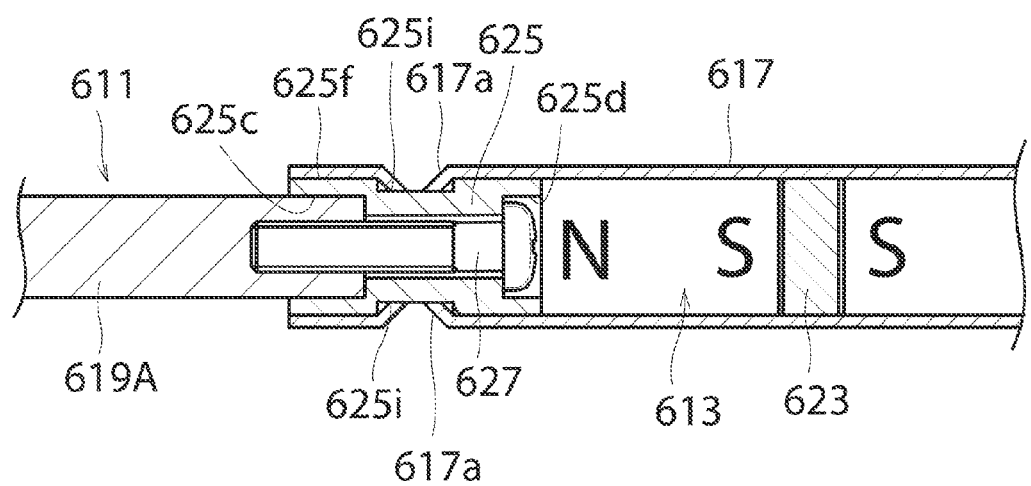
FIG. 20 is a cross sectional partial view of another mover usable for the linear motor of the present invention.
Figure 22:
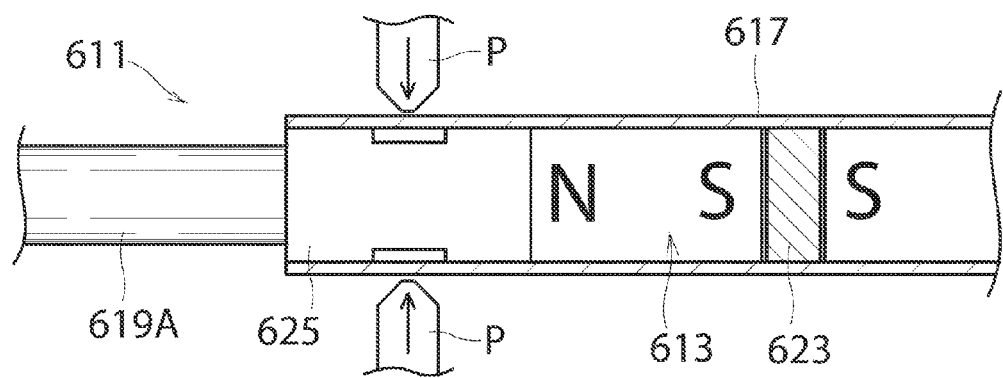
FIG. 22 is an illustration used to explain how to construct the mover of FIG. 20.

FIG. 20 is a cross sectional partial view of another mover usable for the linear motor of the present invention. The mover of this embodiment is the same in structure as that of the linear motor shown in FIGS. 4 and 5 except a shaft body and coupling pieces. The counterparts except the shaft body and coupling pieces of this embodiment are allocated reference numbers defined by adding 600 to those of the parts shown in FIGS. 4 and 5, and the explanation of the counterparts is omitted. In this embodiment, as shown in FIGS. 21A and 21B, the surface of an outer peripheral portion 625f of the coupling piece 625 is smooth. The outer peripheral portion 625f is formed with two rectangular concave portions 625i radially opposed to each other. As shown in FIG. 20, the shaft body 617 is formed with two convex portions 617a to be fitted with the two concave portions 625i of the coupling piece 625. As shown in FIG. 22, the convex portions 617a are formed by press working the shaft body 617 fitted with the coupling piece 625 using a pressing machine P. The coupling pieces 625 and the shaft body 617 are tightly fixed by means of the fitting of the convex portions 617a into the concave portions 625i.

According to the present invention, a back yoke may readily be mounted on a plurality of linear motor units simply by combining a pair of back yoke assemblies with respect to the entirety of linear motor units, thereby facilitating the manufacture of the linear motor. To install the linear motor of the present invention, the back yoke may be mounted in some external location, thereby eliminating the necessity of a block frame and a cover to support the linear motor units. Thus, the linear motor may be downsized in volume and weight.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A linear motor comprising:
a plurality of linear motor units each including:
   a mover including a direct drive shaft capable of reciprocating in an axial direction of the shaft and a permanent magnet array formed of a plurality of permanent magnets mounted to the direct drive shaft; and
   a stator having a plurality of excitation windings disposed along an axial line of the direct drive shaft, the excitation windings being each formed of a winding conductor wound in a coil such that the mover reciprocates in an inner space defined inside the excitation windings;
the linear motor units being arranged such that the respective direct drive shafts of the liner motor units are juxtaposed in parallel; and
a back yoke disposed outside the respective stators of the linear motor units to partly form respective magnetic circuits of the linear motor units, the back yoke being constituted from a back yoke assembly made of magnetic material and including a surrounding portion entirely surrounding the linear motor units, wherein:
the stator including an insulating pipe inside of which the mover is disposed and on which the excitation windings are mounted;
a pair of end brackets are fixed at axial ends of the insulating pipe, the end brackets each having a bearing fixed therein to support the end of the direct drive shaft movably in the axial direction and unrotatably in a circumferential direction;
the back yoke assembly is disposed across the pair of end brackets;
each direct drive shaft includes a cylindrical shaft body housing the permanent magnet array formed of the plurality of permanent magnets that are arranged such that magnetic poles having the same polarity are opposed to each other, and a pair of shaft end members connected to axial ends of the shaft body and supported by the bearings;
the shaft body and the pair of shaft end members are coupled by coupling pieces;
the shaft body is fixedly fitted with an outer peripheral portion of each coupling piece; and
the shaft end members are fixedly fitted into an inner peripheral portion of each coupling piece.

2. The linear motor according to claim 1, wherein the back yoke assembly has one or more partition wall portions fixed inside the surrounding portion to partition adjacent two of the linear motor units to form a common magnetic circuit therebetween.

3. The linear motor according to claim 2, wherein:
the surrounding portion of the back yoke assembly includes a first divided assembly and a second divided assembly that are combined such that abutting surfaces of the first and second assemblies extend in a direction where the linear motor units are arranged; and
the one or more partition wall portions are fixed to the first and second assemblies via fitting structures, respectively.

4. The linear motor according to claim 3, wherein the first and second assemblies have the same dimension and shape.

5. The linear motor according to claim 3, wherein the first and second assemblies are each formed by press working a magnetic plate.

6. The linear motor according to claim 3, wherein:
lead wires are connected to the excitation windings to supply electric power to the excitation windings; and
at least one of the first and second assemblies has a through hole formed for the lead wires to pass therethrough.

7. The linear motor according to claim 1, wherein:
the outer peripheral portion of each coupling piece has a smooth surface portion located to the center of the shaft body in a longitudinal direction of the shaft body and a rough surface portion located away from the center of the shaft body in the longitudinal direction; and
end portions of the shaft body are disposed to be in contact with both of the smooth and rough surface portions.

8. The linear motor according to claim 1, wherein:
the outer peripheral portion of each coupling piece has a plurality of concave portions formed therein; and
the end portions of the shaft body have a plurality of convex portions formed therein to be fitted with the concave portions.

* * * * *